United States Patent
Bazrafkan et al.

(10) Patent No.: US 11,710,306 B1
(45) Date of Patent: Jul. 25, 2023

(54) MACHINE LEARNING INFERENCE USER INTERFACE

(71) Applicant: Blackshark.ai GmbH, Graz (AT)

(72) Inventors: Shabab Bazrafkan, Graz (AT); Martin Presenhuber, Graz (AT); Stefan Habenschuss, Graz (AT)

(73) Assignee: Blackshark.ai GmbH, Graz (AT)

( * ) Notice: Subject to any disclaimer, the term of this patent is extended or adjusted under 35 U.S.C. 154(b) by 0 days.

(21) Appl. No.: 17/849,397

(22) Filed: Jun. 24, 2022

(51) Int. Cl.
| | |
|---|---|
| G06V 10/94 | (2022.01) |
| G06V 10/70 | (2022.01) |
| G06V 10/22 | (2022.01) |
| G06F 3/04842 | (2022.01) |
| G06T 11/40 | (2006.01) |
| G06V 10/776 | (2022.01) |

(52) U.S. Cl.
CPC ........ G06V 10/945 (2022.01); G06F 3/04842 (2013.01); G06T 11/40 (2013.01); G06V 10/235 (2022.01); G06V 10/776 (2022.01); G06V 10/87 (2022.01); *G06T 2200/24* (2013.01); *G06T 2210/62* (2013.01)

(58) Field of Classification Search
CPC .. G06V 10/945; G06V 10/235; G06V 10/776; G06V 10/87; G06F 3/04842; G06T 11/40; G06T 2200/24; G06T 2210/62
See application file for complete search history.

(56) References Cited

U.S. PATENT DOCUMENTS

| | | | | |
|---|---|---|---|---|
| 6,718,336 | B1* | 4/2004 | Saffer | G06F 16/25 |
| | | | | 707/999.102 |
| 2004/0075670 | A1* | 4/2004 | Bezine | H04N 21/431 |
| | | | | 348/E5.002 |
| 2013/0254692 | A1* | 9/2013 | Han | G06F 3/0486 |
| | | | | 715/825 |
| 2017/0068406 | A1* | 3/2017 | Mark | G06F 3/04886 |
| 2017/0330193 | A1* | 11/2017 | Tolson | G06Q 10/1095 |
| 2018/0089763 | A1* | 3/2018 | Okazaki | G06T 11/60 |
| 2019/0095069 | A1* | 3/2019 | Proctor | G06F 3/011 |
| 2020/0279364 | A1* | 9/2020 | Sarkisian | G06F 16/252 |
| 2022/0171818 | A1* | 6/2022 | Gregori | G06N 3/045 |
| 2022/0301031 | A1* | 9/2022 | Iyer | G06Q 30/0623 |
| 2022/0338833 | A1* | 10/2022 | Dhatt | A61B 8/12 |

OTHER PUBLICATIONS

Wu, Xiongwei, et al., "Recent advances in deep learning for object detection", Neurocomputing 396 (2020) 39-64 (Year: 2020).*

* cited by examiner

*Primary Examiner* — William A Beutel
(74) *Attorney, Agent, or Firm* — Beyer Law Group LLP

(57) ABSTRACT

Two-dimensional objects are displayed upon a user interface; user input selects an area and selects a machine learning model for execution. The results are displayed as an overlay over the objects in the user interface. User input selects a second model for execution; the result of this execution is displayed as a second overlay over the objects. A first overlay from a model is displayed over a set of objects in a user interface and a ground truth corresponding to the objects is displayed as a second overlay on the user interface. User input selects the ground truth overlay as a reference and causes a comparison of the first overlay with the ground truth overlay; the visual data from the comparison is displayed on the user interface. A comparison of M inference overlays with N reference overlays is performed and visual data from the comparison is displayed on the interface.

26 Claims, 14 Drawing Sheets

US 11,710,306 B1

MACHINE LEARNING INFERENCE USER INTERFACE

FIELD OF THE INVENTION

The present invention relates generally to machine learning. More specifically, the present invention relates to a user interface that facilitates machine learning inference comparisons.

BACKGROUND OF THE INVENTION

As known in the art, geo-referenced imagery refers to images, maps, aerial or satellite photographs, etc., which can be related to a geographic coordinate system via the internal coordinate system of the images. Typically, the geographic coordinates (or coordinate transforms) are stored within the image file itself although there are many techniques for implementing geo-referencing. Typical geo-referenced image files include GeoPDF, GeoTIF and geoJPEG. Essentially, geo-referencing refers to the association of an image file with locations in physical space and making such image files useful for mapping as it explains how other data relate to the image files.

It is a challenge to execute (perform an inference) and test one or more machine learning models on geospatial images for user-specified regions at the same time. Often the users performing the inference or testing have no machine learning knowledge or data science backgrounds. Especially for geo-referenced imagery, the machine learning inference, testing and comparing of models is difficult. Typically, a user downloads an image, writes code to use a model, executes the model, looks at the results in his or her screen, and then stores the result. In one possible arrangement of the proposed solution a user then loads another image and repeats the process and may repeat this step. The user compares results manually by opening and closing the various stored result files.

Accordingly, new techniques and systems are desired to perform inference on images using a variety of models and to compare the results quickly and easily without delay and laborious processing steps.

SUMMARY OF THE INVENTION

To achieve the foregoing, and in accordance with the purpose of the present invention, a user interface is disclosed that allows a user to execute a computer machine learning model or a pipeline of such models on an image or portion of an image and to compare the results quickly and easily.

In a first embodiment, two-dimensional objects are displayed upon a user interface and user input selects an area that includes a subset of these objects. User input then selects a machine learning model for execution, the model is executed upon the selected objects and the results are displayed as an overlay over the objects in the user interface.

In a second embodiment, a first overlay from a first machine learning model is displayed over a set of objects in an image of a user interface. User input selects a second machine learning model for execution, the model is executed upon the objects in the image, and the result of this execution is displayed as a second overlay over the objects in the user interface.

In a third embodiment, a first overlay from execution of a first model is displayed over a set of objects in a user interface. A ground truth corresponding to the objects in the image is displayed as a second overlay on the user interface. User input selects the ground truth overlay as a reference and causes a comparison of the first overlay with the ground truth overlay; the visual data from the comparison is then displayed on the user interface.

In a fourth embodiment, M inference overlays are displayed on a user interface over a set of objects in an image, each overlay represents the results of execution of a machine learning model. Next, N reference overlays are displayed on the user interface representing information of the objects in the image. User input is received that selects each of the N reference overlays as a reference and causes a comparison of the M inference overlays with the N reference overlays. Visual data from the comparison is then displayed on the user interface.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

This disclosure presents a framework for a machine learning inference user interface designed explicitly for geo-referenced imagery. This framework addresses the challenge of inference and testing at the same time of one or more machine learning models on geospatial images for user-specified regions. The framework may also plot and draw measurements (analytical or statistical) for the user-specified regions on models compared to each other or compared to a predefined ground truth.

The framework is specific to geo-referenced imagery because geo-spatial use cases need the option to work with fractions of a given geographic area. That makes geo-spatial use cases unique in comparison to use cases where you can load whole pictures of the area of application. In general this invention might be used for any application but, in geospatial use cases the samples are potentially stretched infinitely in all direction. In other words, running an inference on a map means to run it on the whole scene which could be the whole planet. In our invention we give the user the possibility to choose a polygon, line or point on which to run the inference, which is applicable to geo-spatial applications.

In general, machine learning consists of two main parts. The first is a training phase in which a machine learning model is created and then trained by inputting a subset of known data (a training data set) into the model. The second part is the actual execution of the trained model on unknown input data (the so-called "inference") in which the model is put into action to produce actionable output, i.e., make a prediction. During actual execution, a machine learning inference engine executes the algorithm of the model and returns output which identifies, sorts, classifies, converts, etc., the input unknown data.

In these embodiments, the coordination of a set of machine learning models is used in order to detect objects or classes of geographic properties in an image (e.g., land use classes). Our invention brings all of these object detection possibilities together and makes them manageable and comparable.

Thus, in machine learning the inference step is when the end users receive results and may perform comparisons between different models and data slices. But, often these users have no machine learning knowledge or data science backgrounds. This invention facilitates the inference operation in ML-based geospatial data processing. It provides the user with an interface to select different regions of the geospatial data, to apply different models to the data at the same time and optionally to perform analytical or statistical comparisons between different models or slices of the data. The user is also able to download the results into local storage or upload the results from the local storage into a server.

Inference Framework System

Figure 1:
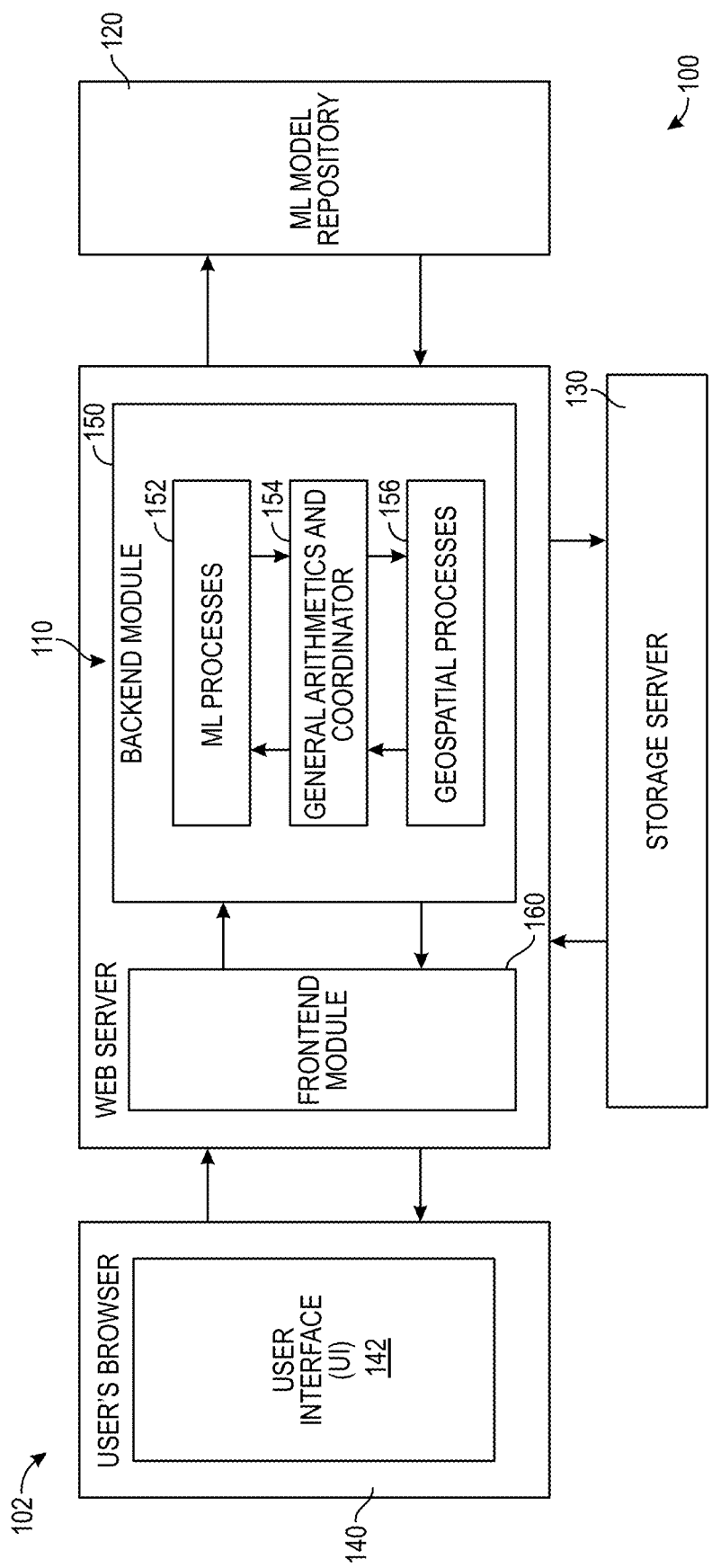
FIG. 1 illustrates an inference framework system that includes a user computer, a Web server executing upon a server computer, a storage server and a machine language model repository.

FIG. 1 illustrates an inference framework system 100 that includes a user computer 102, a Web server 110 executing upon a server computer, a storage server 130 and a machine language model repository 120.

Figure 2:
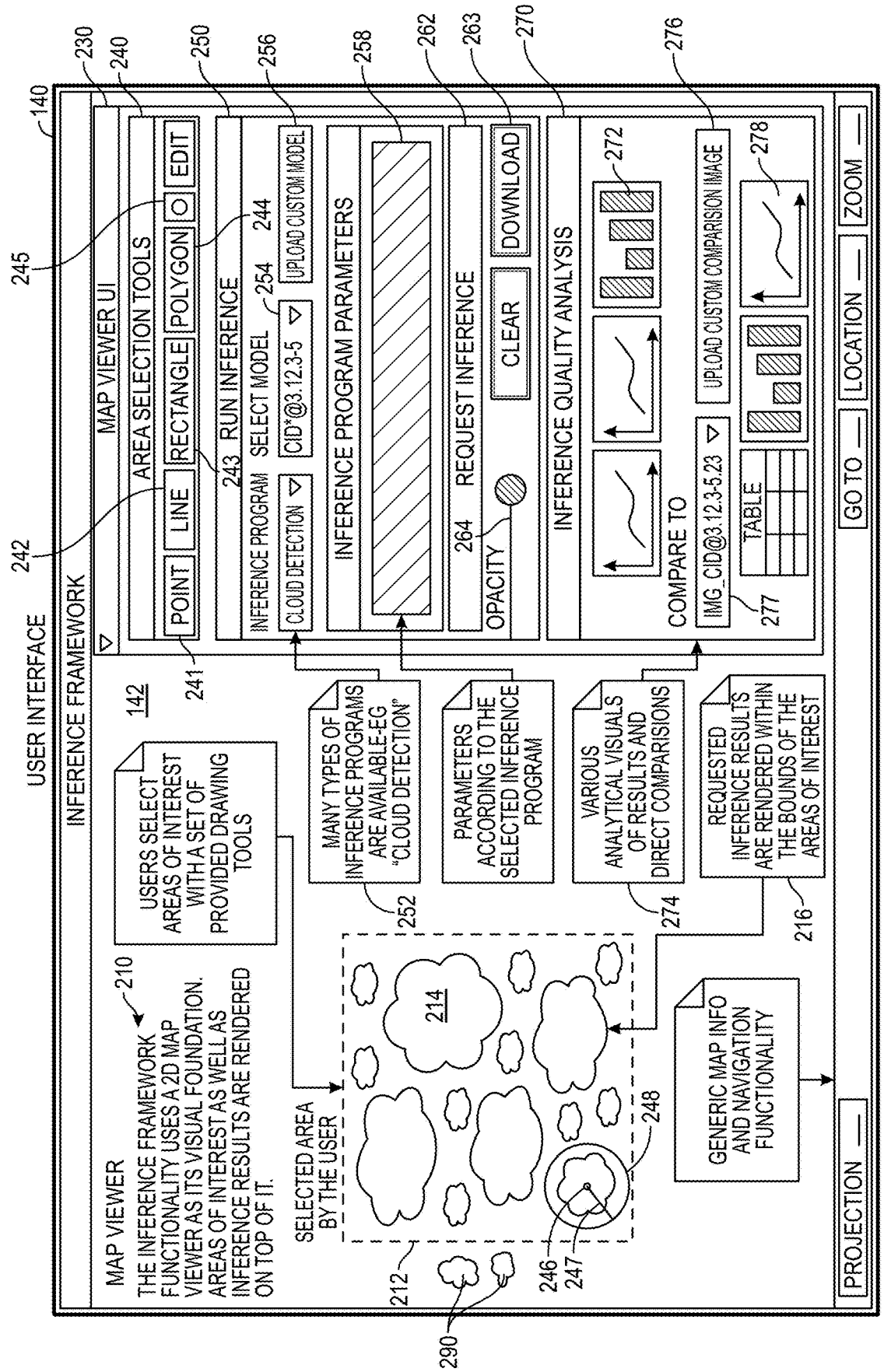
FIG. 2 illustrates an example user interface displayed upon the user's computer.
Figure 4:
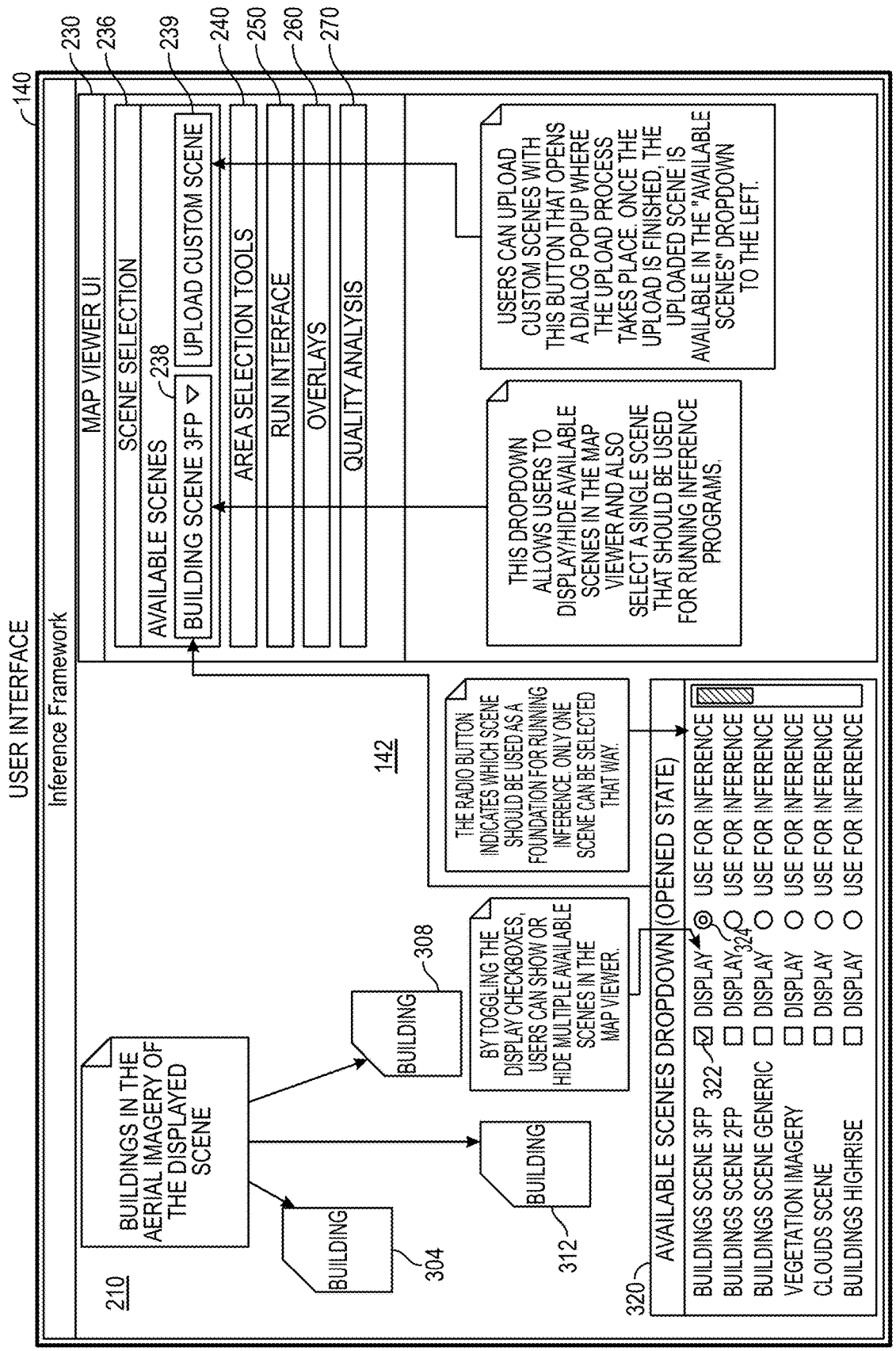
FIG. 4 illustrates user interface on a user's computer when a scene has been chosen but before selecting an area of interest.

User interface 142 is the component with which the user is directly interacting and is described in greater detail in FIG. 4 (FIG. 2 is an illustrative example). This interaction may be through Web browser 140 or via a stand-alone application. The UI 142 consists of several views and sub-views in which the user can see the data and the output of the machine learning model. It also includes different buttons that the user uses to select for instance a point, line, or region (for example polygons or multi-polygons). There are other buttons such as an option to select the machine learning model (or pipeline of models) within which the selected regions will be inferred. Optionally, there are analytical and statistical functions available for the user to execute for evaluating the inference outputs.

Storage server 130 is the location (local or remote) where all the data is stored, and may be on the same computer as Web server 110 on a different, remote computer. The data may have any suitable format for example raster, vector, or point clouds. The storage server is also used to store the output of the machine learning models and the results of the analytical or statistical operations. Optionally, the storage server supports data and code versioning.

Machine learning model repository 120 is the location (local or remote) where the machine learning models are stored. These models may be generated from any machine learning platform or source and may be uploaded by the user using the user interface. Optionally, the model repository 120 supports model versioning or enforces a specific structure of metadata for each model. This metadata, for example, includes the information about how the model is generated (e.g., which dataset it was trained on, which loss function was used in the training, which optimizer was applied to the model parameters) and also the requirements for the data structure in order to run the model (e.g., number of the input and output channels, the channel order, activation function of the last layer, to name a few) and any miscellaneous information such as date and time of the model checkpoint.

Web server 110 is the main processing unit of the inference engine. This server may be located on a local machine or on a remote server computer. As an example, it consists of a front-end 160 and back-end submodules 150. The front end is responsible for generating the user interface 142 dynamically and the back end is responsible for performing the arithmetic, geospatial, and machine learning operations. As an example, the back-end tasks consist of: a general arithmetic and coordinator 154 which deals with the requests from the front end, such as fetching and preparing the data from the storage server, triggers the geospatial and ML processes sub-modules, and calculates the measurements for analytical and statistical evaluations; ML processes 152 which fetch the ML models from the repository, and applies the data to the models, optionally it utilizes different types of workers (CPU, GPU, TPU, etc.) to accomplish these tasks; and geospatial processes 156 which is responsible for reading and writing different layers, clipping or cropping the geo-referenced data, mapping reference systems, rasterizing and vectorizing the data.

The inference framework is essential in providing to the platform users the ability to execute, visualize and evaluate the result of different models in a single scene or in a set of scenes. It optionally provides possibilities for comparing different results and runs analytical evaluations to compare several models at the same time. Downloading the results gives the user the possibility to store the model output or load it into other geo-spatial platforms. Uploading the results provides the user the ability to compare results from other sources with the models inside other platforms.

User Interface Example Overview

FIG. 2 illustrates an example user interface 142 displayed upon the user's computer. (FIG. 4 below shows a preferred user interface.) Included are a map viewer 210, basic map information and navigation bar 220, and a map viewer user interface 230 for making selections, controlling inference and making comparisons. Map viewer 210 provides options to navigate, select, and deselect a region of the map. The inference framework functionality uses 2-D map viewer 210 as its visual foundation. Areas of interest as well as inference results are rendered on top of the map viewer. The map viewer's capabilities can be compared with geo-spatial mapping software applications, e.g. Google Maps. The map viewer, including aerial imagery of one or more selected scenes, uses most of or the entire available space of the browser window 140 and is typically in the background. Additional geo-spatial data may be rendered on top of the map. Position and scale is updated if map panning or zooming occurs. UI elements (like the map viewer UI 230) are rendered on top of the map 210 but their position and scale may be fixed.

Navigation bar 220 provides information about the project and tools to explore the map. "Projection" allows the user to change the projection or coordinate system of the map viewer; "Go to" allows the user to enter a latitude and longitude and navigate to that specific point on the map; "Location" shows the current latitude and longitude; and "Zoom" allows the user to change the geospatial standard levels of detail (e.g., LOD12, LOD13, etc.)

Map viewer user interface 230 gives the user options to select different scenes, draw polygonal areas and launch different inferences which may be manually defined by the user or be chosen from predefined plans. This panel 230 contains grouped UI elements for all the functionality that the inference framework provides. In order to save space, irrelevant UI elements according to the current figure state may be represented as collapsed. Scene selection 236 (not shown in this Figure) is a panel in which users may select aerial imagery to use, as well as upload new imagery.

Area selection tools 240 allow the user to select an area on the map within a scene by using a specific selection tool such as point 241, line 242, rectangle 243, polygon 244 or circle 245; regions may also be edited or changed. Shown is an area 212 that a user has selected using rectangle tool 243. Advantageously, the user may select an area of an image that is not the entire image. By way of example, shown within the map are a number of clouds 214 that have been selected and are entirely within region 248. The user has, however, chosen not to include clouds 290 which, while part of the image, are not within selected area 248. This ability to selectively include in the selected area only a portion of entire image may be used with any of the area selection tools. Thus, when an inference is executed it may be executed upon only a portion of the image and not upon the entire image.

Figure 3:
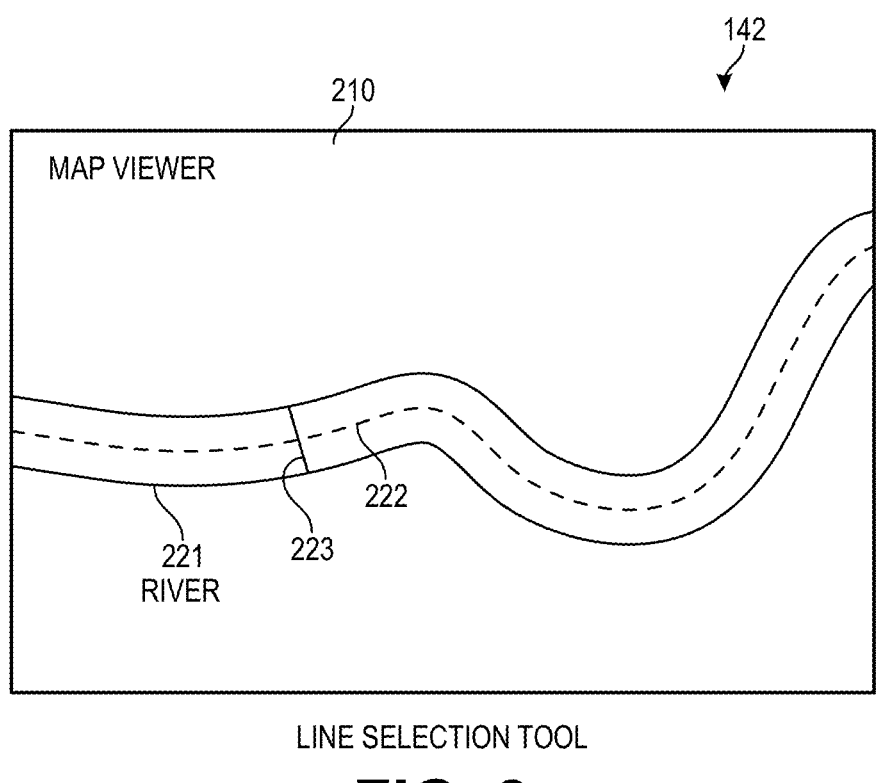
FIG. 3 is shows use of line selection tool.

FIG. 3 shows use of line selection tool 242. Here, within map viewer 210 in UI 142, the user has selected river 221 by using tool 242 to draw a line 222 within the river. As mentioned, use of any of the area selection tools 240 may select an area that is the entire image that has been downloaded or only a small portion of that image, including disjoint areas. In the example of FIG. 3, the line selection tool may be used to select rivers, shoreline, other water features, or any area that can best be selected by drawing a line, straight or not. Lines may be drawn in different areas of the image, thus selecting areas that are disjoint.

A point area selection tool 241 may also be used to select a particular area; by way of example, clicking upon point 246 and then dragging the mouse to define a particular radius 247 results in a circular area 248 as shown that may be the subject of an inference, instead of using objects within area 212.

Run inference is a panel 250 in which users can request inference results for the selected area by choosing an inference program 252 (e.g., "cloud detection") and a machine learning pipeline 254, which is a combination of a set of machine learning models and relations on how to interact with each other. Any of a wide variety of machine learning models may be used. It is also possible to add or upload custom pipelines or models 256. These custom models or pipelines are models that the user uploads from somewhere other than the model repository 120. For instance, the user may have obtained the model from elsewhere, may have trained the model himself or herself, may have downloaded the model from a Web site on the Internet (such as from GitHub), etc. Once inference runs are complete, the corresponding result is displayed as an overlay. In general, a pipeline is a directed graph of processing units connected to each other that may be executed serially or in parallel. In our case, the processing units are in deep neural networks.

Inference program parameters 258 are parameters that may be chosen according to the selected inference program. For instance, parameters include the number of input channels, the normalization of each channel, a model architecture, the order of channels (e.g., if it is RGB or the other way around), the presence of near infrared or not, etc.

Download button 263 allows the user to download any of the results to his or her computer (or to a cloud drive authorized by the user), meaning downloading the overlays that are shown on the user interface after an inference. Thus, an image that includes the objects in the selected area that have been annotated, flagged, shaded, etc. after an inference may be downloaded.

Figure 8:
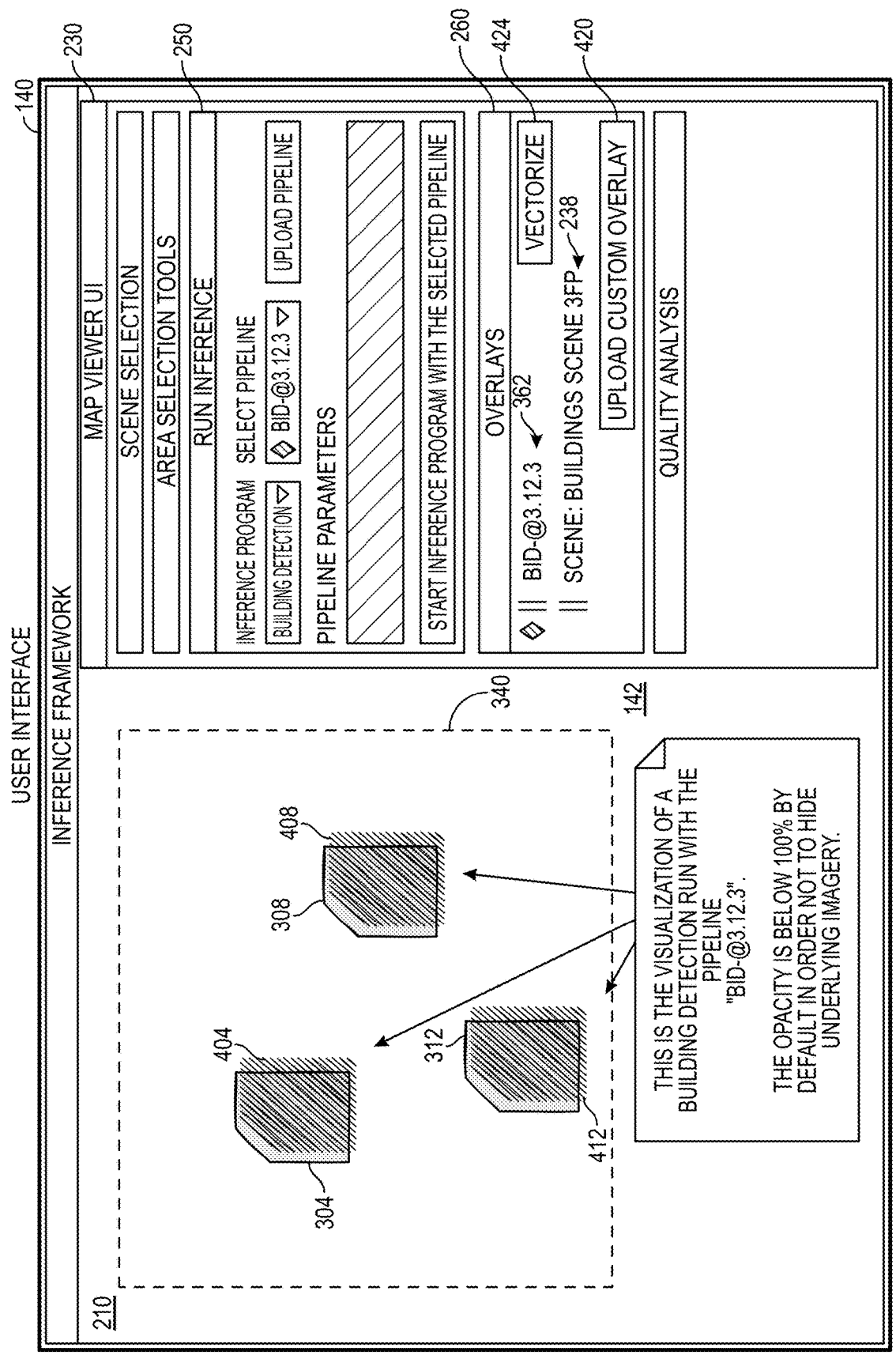
FIG. 8 illustrates user interface on a user's computer after executing a first inference using a selected pipeline.

Opacity slider 264 allows the user to change the opacity of the overlay for the most recent inference that has been run, for example, FIG. 8 (and following) show an overlay that is not 100% opaque. An overlay that is 100% opaque does not allow the user to see objects in the underlying image (such as a building footprint), while an overlay that is less than 100% opaque allows the user to see the objects below that overlay. The option to adjust the capacity for a particular overlay may also be presented in overlays panel 260 (currently not shown) by providing an opacity option and slider 264 for each entry.

Overlays 260 (not shown in this Figure) is a panel in which users can individually display and hide all available overlays. Additionally, the order and opacity of every overlay can be adjusted here. It is also possible to upload custom overlays in addition to the overlays that were created by running an inference program.

For each raster-based inference result, the user can create a vectorized version by selecting the initial result, a "Vectorize" option and one of the available vectorization algorithms; it is then added to the list of results. Rasterization of vector-based results is also possible by choosing a "Rasterize" option. As is known in the art, a raster consists of a matrix of cells (or pixels) organized into rows and columns (or a grid) where each cell contains a value representing information, such as temperature. Rasters may be digital aerial photographs, imagery from satellites, digital pictures, scanned maps, etc., and are stored in formats such as TIFF images, GeoTIFF images, etc. On the other hand, vector files represent the same images (and may appear the same as the raster image) but store polygons, lines, location of points instead of pixels. Each of these types of files may be created and stored when selected by the user and the user may compare the rasterized results or the vectorized results.

Inference quality analysis panel 270 provides numerical and graphical evaluations of the image and different inference results. Using this panel, users can compare overlays to each other by marking them for comparison and choosing a set of specific reference overlays, for example, custom uploaded "ground truth" overlays. The inference framework also generates a quality analysis report which is displayed in tables as well as in charts. Reports can be downloaded to the local machine. Shown are example charts and tables 272 and 278 that are the results of comparison, a selected model 277 that may be compared to the current model executed 254, and the ability 276 to upload other custom images for comparison. Other embodiments and a different interface for quality analysis panel 270 is shown below in FIGS. 11-12.

User Interface

FIG. 4 illustrates a preferred user interface on a user's computer. In this example, user interface 142 shows when a scene has been chosen but before selecting an area of interest. For simplicity, this example uses a scene that only contains the footprints of three buildings (taken from satellite aerial imagery) shown in the current viewport of the map viewer. As shown in the scene selection panel 236, drop-down menu 238 allows a user to display or hide available scenes in the map viewer and also to select a single scene that will be used for running inference programs. Drop-down menu 239 allows the user to upload custom scenes by opening a dialog pop-up window to initiate the upload process. Once the upload has finished, the uploaded scene is available in the available scenes window 320 shown at the lower left.

By selecting menu 238 the user has opened available scenes window 320 showing scenes that are available for display in the map viewer. As shown in window 320, the user has selected "buildings scene 3FP" by selecting one of the check boxes in column 322; by toggling these display checkboxes, a user can show or hide multiple available scenes in the map viewer. The names of the scenes in the first column are file names of particular geographic regions. As shown in the map viewer, the scene includes aerial views of the footprints of different buildings 304, 308 and 312. Although these buildings are shown as having the same shape and size for ease of illustration, in actual operation these footprints 304-312 may be quite different from each other, while in some cases various building footprints may appear similar in shape and size (e.g., many residential buildings may have the same basic footprint).

Selecting the other scenes as shown will display buildings using 2FP (a file name for "footprint No. 2)), or other aerial views of generic buildings, vegetation, clouds or high-rise buildings. These other scenes may be from the same geographic area of the buildings shown, or can be scenes be from other geographic areas. Selecting a scene will load the image corresponding to the file name. Thus, the user will see the actual geo-image in the user interface when the scene is loaded.

By selecting one of the radio buttons from column 324 user may indicate which scene should be used as a foundation for running an inference. Only one scene may be selected at a time. After selecting a scene or scenes as shown, the next step will be to create an area that contains the objects of interest.

Figure 5:
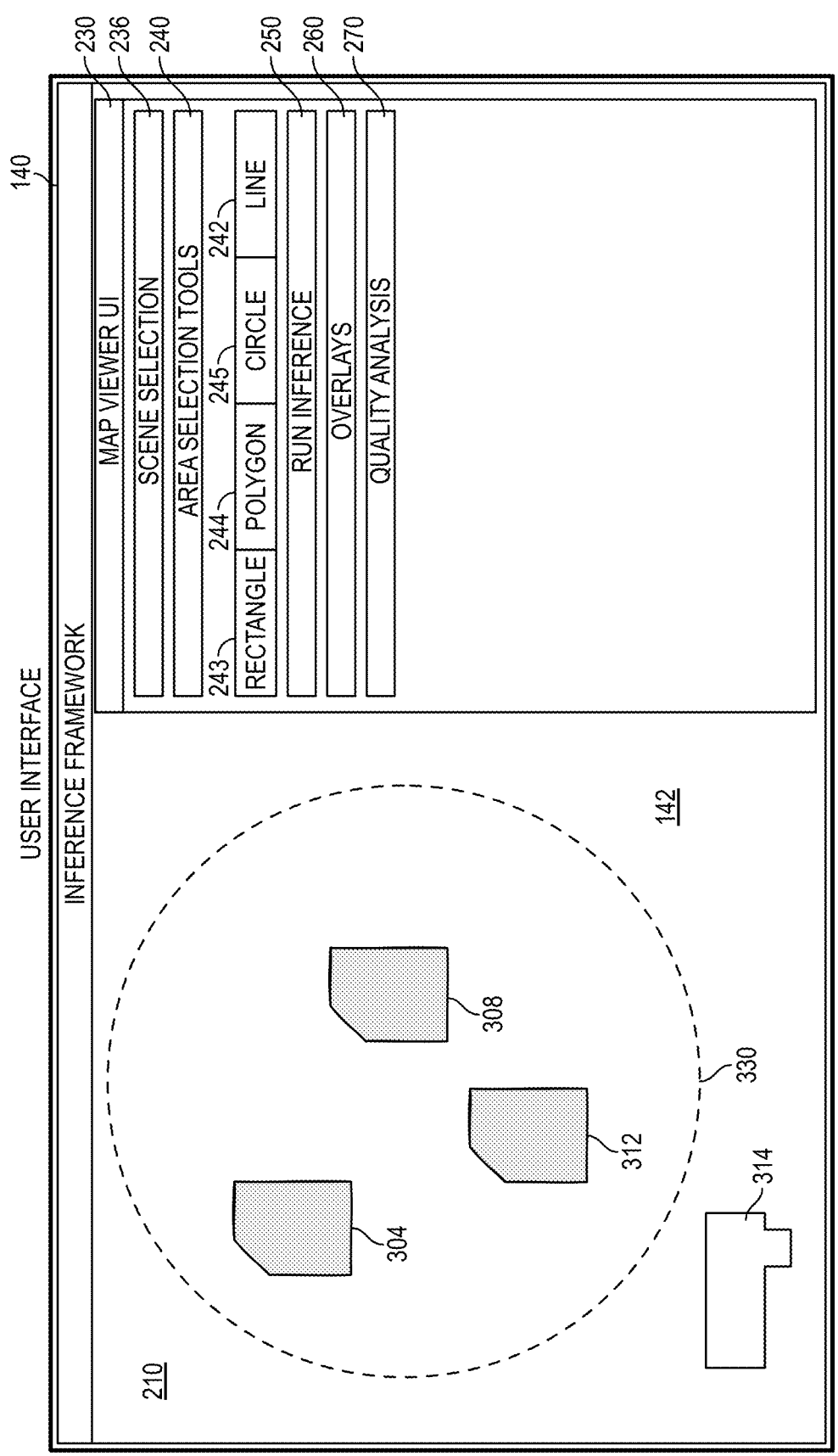
FIG. 5 illustrates user interface on a user's computer after a user has selected an area of interest using the circle tool.

FIG. 5 illustrates user interface 142 on a user's computer after a user has selected an area of interest using the circle tool. As mentioned above, an area of interest can be selected using any of the area selection tools 240, and that area will include the objects of interest for which an inference will be executed. In this example, circle tool 245 has been used. In order to create a circular area of interest 330 the user selects the circle tool, selects the center point of the desired circle (for example, by clicking the mouse) and then adjusts the radius of the circle by moving the mouse away from the center point and then either releasing the mouse or clicking a second time to confirm the radius and thus defining the circular area of interest. When executing an inference only the area of interest and the objects within it (such as building footprints) will be taken into account.

Figure 6:
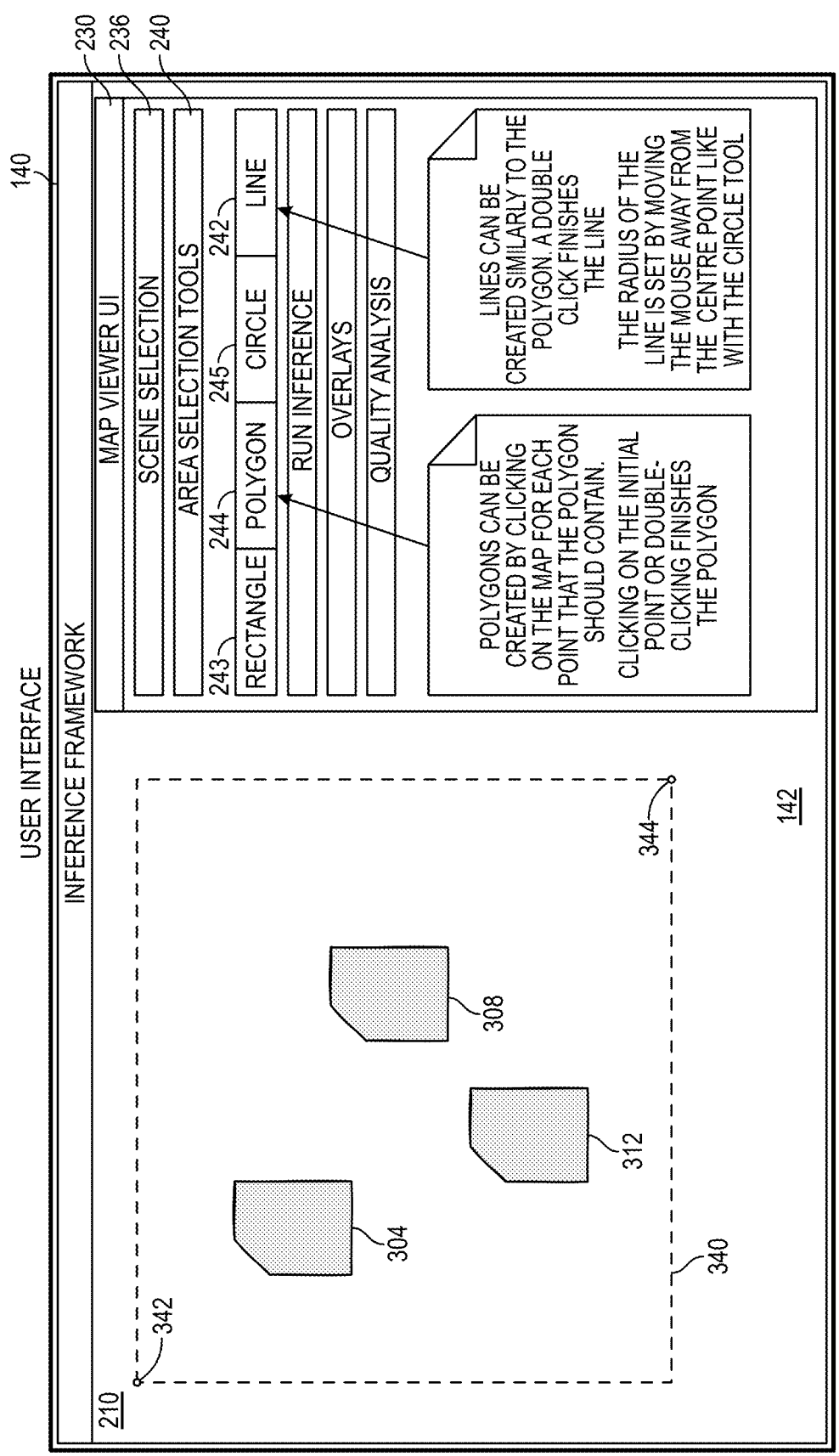
FIG. 6 illustrates user interface on a user's computer after a user has selected an area of interest using the rectangle tool.

FIG. 6 illustrates user interface 142 on a user's computer after a user has selected an area of interest using the rectangle tool. As mentioned above, an area of interest can be selected using any of the area selection tools 240, and that area will include the objects of interest for which an inference will be executed. In this example, rectangle tool 243 has been used. In order to create a rectangular area of interest the user selects the rectangle tool, and then selects two points on the map which will represent two opposing corner points of a resulting rectangle, such as points 342 and 344, thus defining the rectangular area of interest 340. When executing an inference only the area of interest and the objects within it (such as building footprints) will be taken into account.

Polygons can be created by first clicking upon polygon tool 244 and then clicking on the map for each point (or vertex) that the polygon should contain. Clicking on the initial point or double-clicking finishes the polygon. Linear areas of interest may be created similar to how polygonal areas are created. The user clicks points that are contained within a line (which need not be straight); double-clicking finishes the line. The width of the area selected by the line tool may be set by clicking the mouse anywhere on the line and then moving away from the line at a 90° angle and double-clicking or releasing the mouse. An example of using the line tool is shown in FIG. 3 where a line 222 has been drawn and a width 223 has been selected, thus encompassing river 221. Other techniques may be used such as selecting the radius or width first, holding the mouse button down, and then drawing a line with the mouse that will then have the selected width that defines the area of interest.

Figure 7:
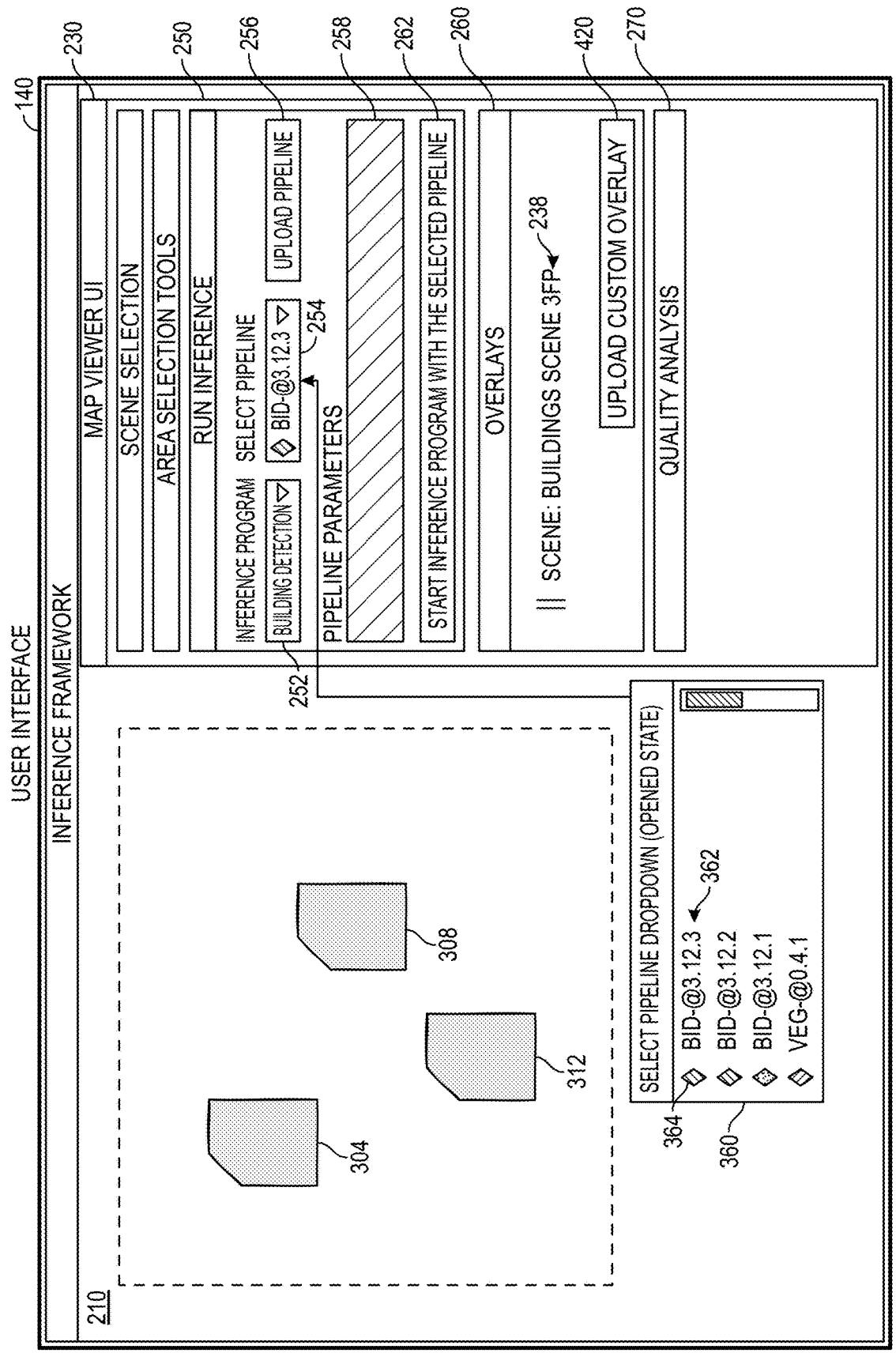
FIG. 7 illustrates user interface on a user's computer after a user has selected an area of interest and before executing an inference.

FIG. 7 illustrates user interface 142 on a user's computer after a user has selected an area of interest and before executing an inference. Shown is rectangular area of interest 340 including objects of interest (i.e., building footprints) 304-312. As shown in run inference panel 250, the user has used drop-down menu 252 in order to select a particular inference program, in this case, "building detection." The user may select any of a variety of inference programs such as "cloud detection," "vegetation detection," each having specific machine learning pipelines. In this example, using drop-down menu 254 the user has opened window 360 in order to select a particular machine learning pipeline, in this case, bld-@3.12.3 362. Other machine learning pipelines that may be selected are also shown in window 360.

Each pipeline may be flagged by a user (using a particular crosshatching, color, etc.) to indicate a high-level state of the pipeline itself. For example, flag 364 (in this example, in the shape of the diamond) can be set by clicking upon symbol 364 and then choosing the appropriate crosshatching or color from entries from within a pop-up window. For instance, the various crosshatchings or colors may indicate that the pipeline is "state-of-the-art," "a good candidate," "experimental," "deprecated," "flawed," etc. These symbols (such as symbol 364) are used in several locations of the user interface 142 and indicate at a quick glance to the user the high-level state of a particular model or pipeline.

Further, as shown at selection 256, custom machine learning pipelines may be uploaded as long as they are compatible with the pipeline parameters structure. After a custom pipeline has been successfully uploaded, it is available to every user. Although none are shown, pipeline parameters window 258 would show any pipeline parameters for the particular pipeline that can be adjusted. By way of example, the "order of channels" such as "blue-greenred" may be changed to be instead "red-green-blue." Input channels such as these can be arranged as you want as long as the network has been set up. Thus, the order is up to the needs of the ML models in the pipeline. In general, a parameter is specific to a particular model; a simple example is input data resolution.

Overlay panel 260 is populated with various entries such as names of scenes selected, uploaded custom overlays, or particular pipelines used after each successfully-finished inference run. In this example, scene 238 is listed as an entry because it had been selected earlier. Now, the user selects button 262 in order to execute an inference using the area, objects, pipeline (models) and parameters selected.

FIG. 8 illustrates user interface 142 on a user's computer after executing a first inference using a selected pipeline. Shown is rectangular area of interest 340 including objects of interest (i.e., building footprints) 304-312. After the inference program "building detection" (using a particular selected pipeline) has been executed and has successfully finished, a corresponding visualization is added to the map viewer as an overlay on top of the aerial imagery of the building footprints. Shown is the visualization after the "building detection" inference program has been run using the pipeline bld-@3.12.3. As shown, overlay regions 404, 408 and 412 using a particular type of crosshatching have been added over the existing building footprints. This overlay can be toggled on or off in the overlay panel 260 and its opacity can be modified as well. The opacity is below 100% (by default) in order not to hide the underlying imagery of the building footprints. As shown, the outline of the building footprints can be seen through the overlay regions 404-412.

In this example, the pipeline is quite accurate, and the detection has detected the (more or less) correct size and shape of each of footprints 304-312, as shown by regions 404-412 coinciding with footprints 304-312. In other examples using other pipelines it is possible that the detection of a pipeline will not be as accurate and the resulting visualization may be a slightly different shape than the original footprint or may also be offset from the original footprint. In other words, regions 404-412 may be offset from the building footprints 304-312 because the inference detection has not detected the exact location of each building. It is also possible that regions 404-412 will not be the same shape as footprints 304-312 because the inference is not perfect and has not detected what the actual footprint is.

In general, results that are opaque or nearly opaque mean that the object is definitely identified, whereas a result that is less opaque means that the model is uncertain whether not the object is identified. The model will automatically adjust the opacity of the results based upon certainty of identification and then the user can further change that opacity with a slider.

As mentioned earlier, overlays panel 260 lists the overlays that are shown in map viewer 210 within the area of interest 340. As shown, listed is overlay 238 (the scene) and overlay 362 (the particular machine learning pipeline that has just been successfully executed). The visibility and opacity of each of these individual overlays can be adjusted by clicking upon the overlay name within this overlays panel. Clicking opens up a pop-up window with the corresponding settings that may be changed. In addition, any overlay can also be removed by right clicking upon it and selecting the "remove" option. Further, clicking upon a specific scene overlay (such as scene 238) enables the user to select specific display options for the scene in a pop-up window, such as only displaying certain color channels. Custom overlays can also be added by clicking upon button 420 and uploading geo-referenced images from a pop-up window. Virtually any custom overlay may be uploaded, such as different types of ground truths, other images, sets of images, etc.

Clicking upon button vectorize 424 allows the user to create a vectorized version of the overlay. Most of the inference results consist of raster data, which means that they may be vectorized. Vectorizing an inference results creates a new overlay entry which includes a corresponding visualization. Vice-versa, vectorized inference results can be rasterized, given that the inference program initially created vector data. A vectorized version of an overlay may also be displayed.

As known in the art, a raster is of a matrix of cells (or pixels) organized into rows and columns (i.e., a grid) where each cell contains a value representing a light measurement, in the case of digital aerial photographs, imagery from satellites, digital pictures, even scanned maps, etc. In the image processing, computer vision and machine learning sciences, the images are defined as a set of values in an N-dimensional Euclidean space known as a Tensor and in the 2-D dimensional use cases they also are referred to as a matrix. Two-dimensional images comprise pixels placed in a row and column order, i.e. a raster, wherein each pixel has a value that determines the intensity of that pixel. In the cases where an image is made of some polygonal and multi-polygonal objects, the image may be also represented by a set of vector shapes. These shapes are a set of point locations and the relation between them, i.e., the vector data. This relation determines which point is connected to which other point in the polygon definition. Raster data and vector data are represented differently in computer storage as is known in the art.

Figure 9:
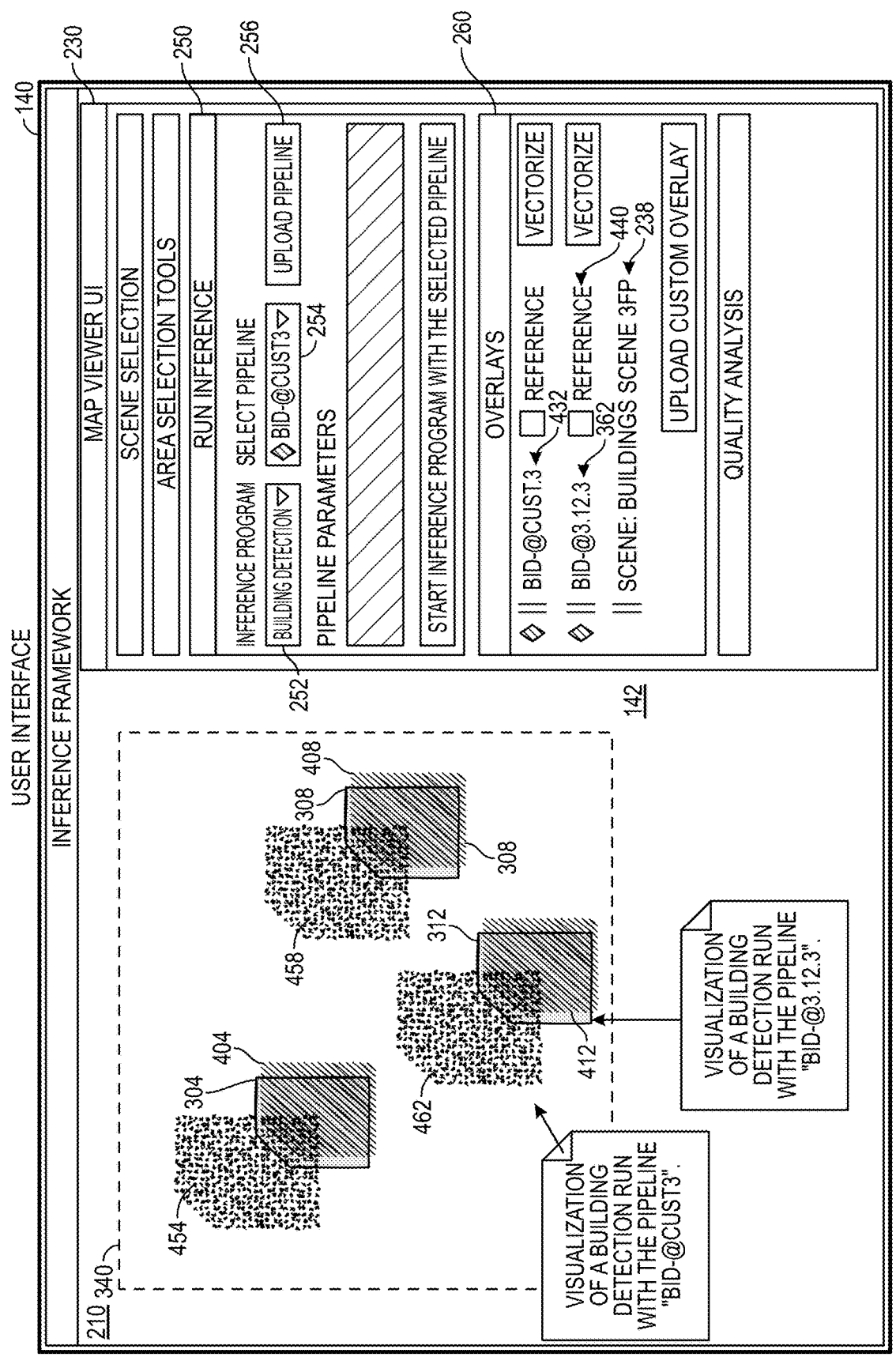
FIG. 9 illustrates user interface on a user's computer after executing a second inference using a custom uploaded pipeline.

FIG. 9 illustrates user interface 142 on a user's computer after executing a second inference using a custom uploaded pipeline. After executing the first inference, the user has selected button 256 in order to upload a custom pipeline (now shown in drop-down menu 254) as pipeline "bld-@cust3" and that second inference has now been executed and displayed.

Accordingly, now shown is rectangular area of interest 340 including objects of interest (i.e., building footprints) 304-312, visualizations 404-412 showing the results of the first inference using the pipeline "bld-@3.12.3", and visualizations 454, 458 and 462 showing detection of buildings using execution of the pipeline "bld-@cust3". The user interface 142 is capable of displaying any number of overlays showing multiple visualizations from multiple inference executions. Again, the new visualizations can be toggled on or off in the overlay panel 260 and their opacity can be modified as well. The opacity is below 100% in order to not hide the underlying imagery of the building footprints. Again, the new visualizations are offset because the inference has detected each building as being in a slightly different location. Each visualization may be offset by the same amount or may be different. It is also possible that each visualization will coincide with the original footprint if the inference is accurate. Each visualization will shown the detected location and shape of a building.

As before, overlays panel 260 lists the overlays that are shown in map viewer 210 within the area of interest 340. As shown, listed is overlay 238 (the scene), overlay 362 (from the first machine learning pipeline), and now overlay 432 (from the second custom machine learning pipeline). These overlays appear in a particular rendering order, and this rendering order can be adjusted by using "drag-and-drop" mouse interactions. Currently, the scene overlay 238 is located at the bottom of the list of all overlays and is therefore rendered behind everything else in the map viewer. Overlay 362 is rendered over overlay 238 and overlay 432 is rendered over overlay 362. Any changes made to the rendering order will be immediately reflected in the map viewer. As before, the visibility and opacity of each of these individual overlays can be adjusted by clicking upon the overlay name within this overlays panel.

The reference checkbox 440 for each overlay indicates whether the overlay is treated as a reference overlay or not. In case there is only one overlay, the check box is hidden. In this example, there are two overlays which may be compared. If the reference check box is checked for one of the overlays this overlay is then considered the reference overlay and the other non-reference overlays can be evaluated against each other by comparing each individual non-reference overlay with the reference.

In the user interface a user can visually compare the results of different inference runs with the actual ground truth. The ground truth in this example is represented as the labeled building footprints 304-312 in the aerial image that is loaded into the user interface. The user has the option to compare the results of an inference run with the ground truth in the user interface. The inference results are, for example, displayed in a semi-transparent manner, that allows a visual comparison with the ground truth as background. If there are several results of different inference runs, the user can display different results at the same time, again, some or all results may be semi-transparent or transparent with outline only. Also, runs on different detection targets can he displayed, e.g., the inference results for a run on vegetation detection can be displayed at the same time as a run on the detection of swimming pools.

Figure 10:
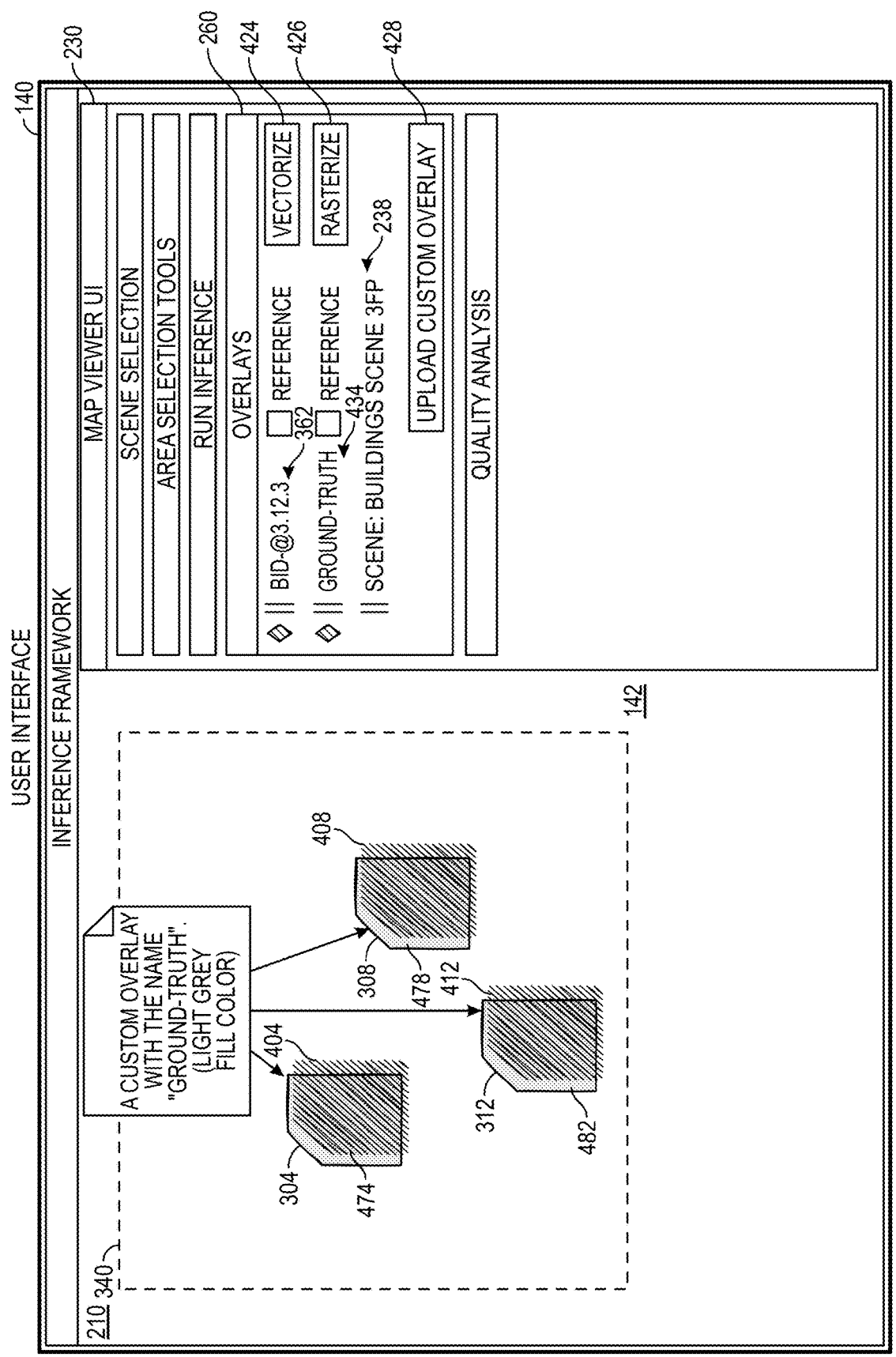
FIG. 10 illustrates user interface on a user's computer after executing a first inference and uploading a custom overlay.

FIG. 10 illustrates user interface 142 on a user's computer after executing a first inference and uploading a custom overlay. After executing the first inference, the user has selected button 428 in order to upload a custom overlay named "ground truth" and that custom overlay is now displayed.

Accordingly, now shown is rectangular area of interest 340 including objects of interest (i.e., building footprints) 304-312, visualizations 404-412 showing the results of the first inference using the pipeline "bld-@3.12.3", and the custom overlay "ground truth" shown as a light gray fill color 474, 478 and 482 within each of the building footprints. As shown, custom uploaded overlays (like a "ground truth") are treated like overlays generated by the inference programs. In an abstract way a ground truth is the layer of geographic information against which everything is measured—the layer of correspondence for comparison. In our case it is a hand-labeled correct marking in the actual map.

As before, overlays panel 260 lists the overlays that are shown in map viewer 210 within the area of interest 340. As shown, listed is overlay 238 (the scene), overlay 362 (from the first machine learning pipeline), and now "ground truth" overlay 434. These overlays appear in a particular rendering order, and this rendering order can be adjusted by using "drag-and-drop" mouse interactions. Currently, the scene overlay 238 is located at the bottom of the list of all overlays and is therefore rendered behind everything else in the map viewer. Overlay 434 is rendered over overlay 238 and overlay 362 is rendered over overlay 434. Any changes made to the rendering order will be immediately reflected in the map viewer. As before, the visibility and opacity of each of these individual overlays can be adjusted by clicking upon the overlay name within this overlays panel.

The result from executing pipeline "bld-@3.12.3" consists of raster data, therefore the result can be vectorized by clicking upon the Vectorized button 424 and selecting a vectorization algorithm in the pop-up window that appears. By contrast, the uploaded custom overlay "ground truth" consists of vector data and therefore can be rasterized by clicking upon the Rasterized button 426 and choosing rasterization parameters in the pop-up window that appears.

Figure 11:
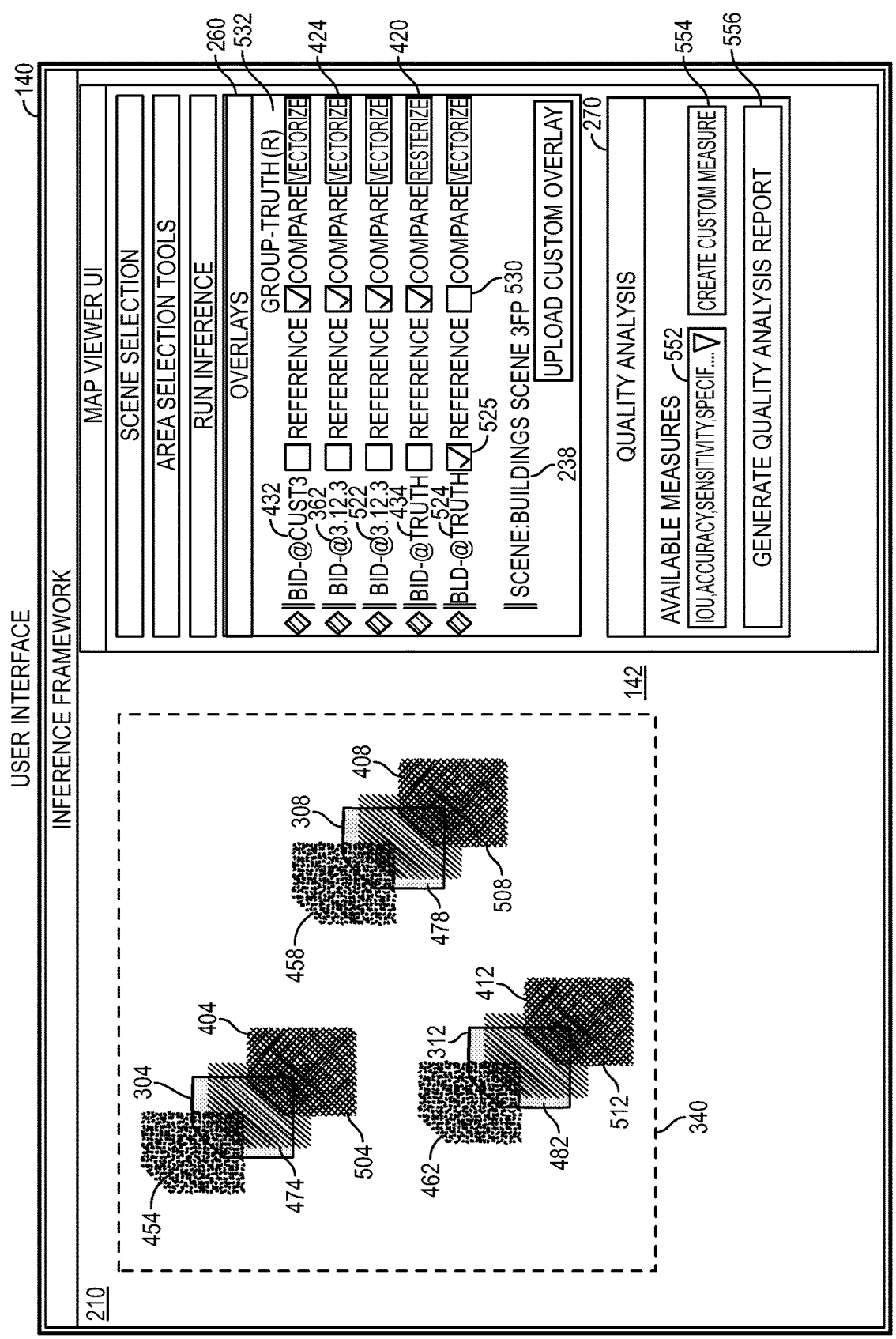
FIG. 11 illustrates user interface on a user's computer after executing three inferences, uploading a custom overlay and rasterizing the ground truth overlay.

FIG. 11 illustrates user interface 142 on a user's computer after executing three inferences (two standard and one custom), uploading a custom overlay (in this case, a "ground truth") and rasterizing the ground truth overlay. Accordingly, now shown is rectangular area of interest 340 including objects of interest (i.e., building footprints) 304-312, visualizations 404-412 showing the results of the first inference using the pipeline "bld-@3.12.3", visualizations 454-462 showing the results of the second inference using the uploaded custom inference, visualizations 504-512 showing the results of the third inference using the pipeline "bld-@3.12.2", and the custom overlay "ground truth" shown as a light gray fill color 474, 478 and 482 within each of the building footprints. The rasterized ground truth will appear in the map viewer as an overlay.

As shown in the overlays panel 260, the user is preparing to compare the three different interface results to the rasterized ground truth. As before, overlays panel 260 lists the overlays that are shown in map viewer 210 within the area of interest 340. As shown, listed is overlay 238 (the scene), overlay 524 (the rasterized ground truth), overlay 434 (the ground truth), overlay 522 (from the third inference), overlay 362 (from the first inference), and overlay 432 (from the second inference). These overlays appear in a particular rendering order, and this rendering order can be adjusted by using "drag-and-drop" mouse interactions. As shown, the order of the overlays has been adjusted and do not appear in the order in which they were applied.

As discussed in the previous figure, the user has selected rasterize button 426 in order to rasterize the ground truth result and this now appears as overlay 524 within the overlays panel 260. Also shown are numerous vectorize buttons 424 indicating that any of the results that consist of raster data may be vectorized. And, as mentioned, the user is preparing to compare inference results to the rasterized ground truth 524 and accordingly has checked the reference check box 525 for the rasterized ground truth. If there is an overlay that is marked as being a reference, then each non-reference overlay can be checked for comparison as shown in the column of compare check boxes 530. As shown at 532, for each reference overlay (in this case rasterized ground truth 524) a header 532 indicates which reference is taken into account when reports are generated for a comparison of overlays.

Quality analysis panel 270 allows a user to request quality analysis reports for any combination of overlays. Generating reports and comparing models or overlays allows the user to see visually quickly and easily which model performs better than other models. It is possible to use N overlays as references and M overlays for comparison, resulting in a maximum of M×N report records. In the case in which N>1, N check boxes will appear for each non-reference overlay, thus providing users with a very granular control of which exact combination of comparisons is desired. Analysis reports may be requested by clicking on the "Generate quality analysis report" button 556. In example is shown, for simplicity and easier visualization, N=1, by selecting only one reference overlay 524. In this example, the user request to evaluate the three "bld" overlays against each other by using the rasterized ground truth overlay 524 as a reference. Clicking on the "Generate" button 556 initializes the request of a quality analysis report, containing 3×1 report records. Available measures drop-down menu 552 allow users to select measures from an available set, such as IOU, Accuracy, Sensitivity, Specificity, etc. Hundreds of measures may be available for use.

Using button 554, users can create custom measures by clicking and writing mathematical functions in a text input field that appears within a pop-up window. The pop-up window also contains a helper panel were all necessary information about variables, operations and syntax is listed. Once a valid custom measure is created, it will be available in the drop-down menu 552.

Figure 12:
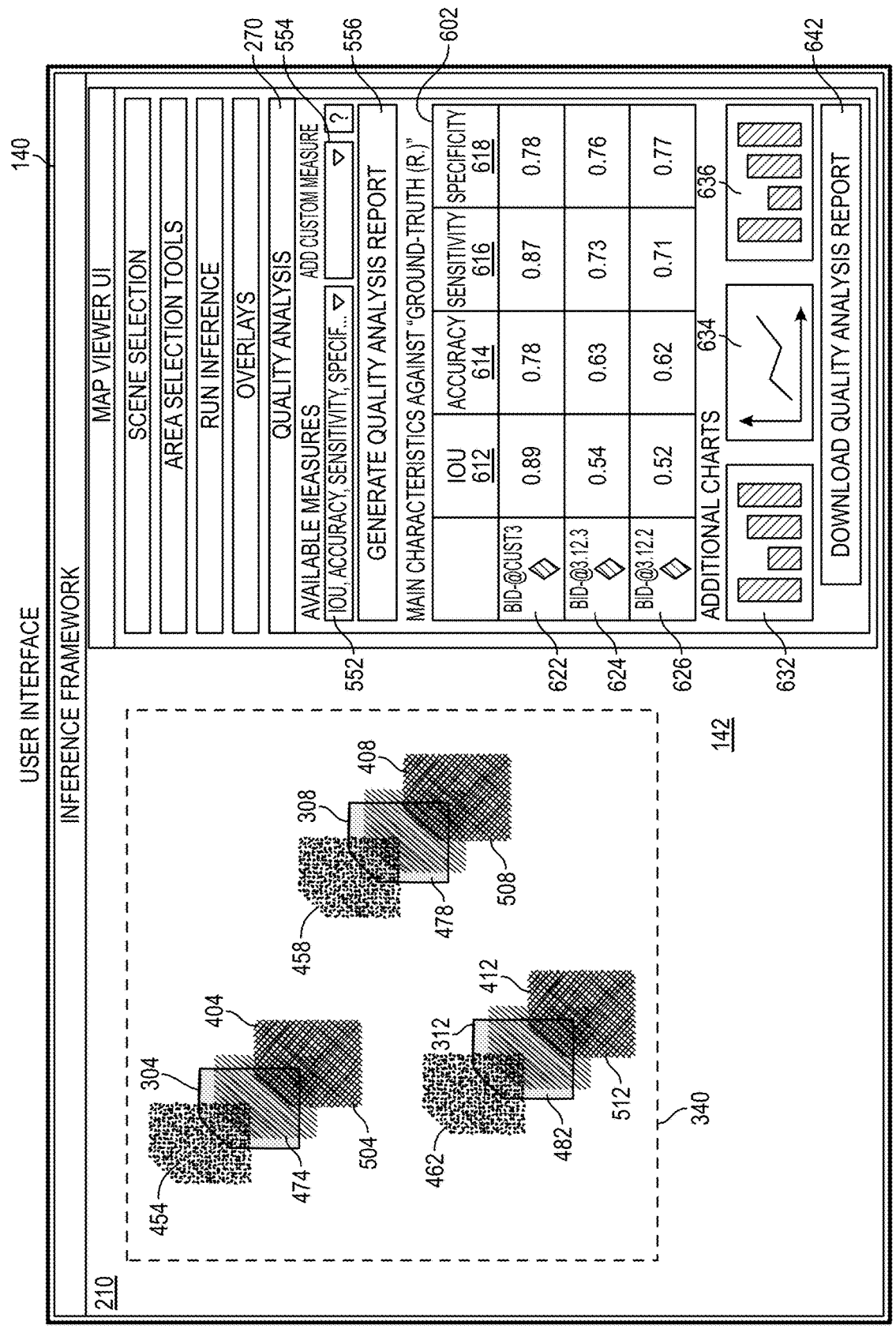
FIG. 12 illustrates user interface on a user's computer after comparing three inferences to the rasterized ground truth.

FIG. 12 illustrates user interface 142 on a user's computer after comparing three inferences (two standard and one custom), to the rasterized ground truth. Still shown in the map viewer 210 is rectangular area of interest 340 including objects of interest (i.e., building footprints) 304-312, visualizations 404-412 showing the results of the first inference using the pipeline "bld-@3.12.3", visualizations 454-462 showing the results of the second inference using the uploaded custom inference, visualizations 504-512 showing the results of the third inference using the pipeline "bld-@3.12.2", and the custom overlay "ground truth" shown as a light gray fill color 474, 478 and 482 within each of the building footprints.

The user has selected the button 556 "Generate quality analysis report" and now shown as a report. Quality analysis reports contain individual quantitative measures of machine learning pipelines in tabular and graphical form. The display statistical data only serves as an example as there is an enormous amount of data available that reflects quality characteristics. Generated reports may also be downloaded as a properly formatted document.

Shown is a table 602 which includes the main characteristics of each inference compared against the rasterized ground truth. Shown are columns 612-618 listing a variety of measures, and each row 622-626 lists each pipeline followed by the quantitative data for each measure. Additional charts 632-636 illustrate graphical data that may reflect the same, combined or modified data as in table 602. By pressing button 642 the user may download a formatted quality analysis report that includes any of the above information.

Flow Diagrams

Figure 13:
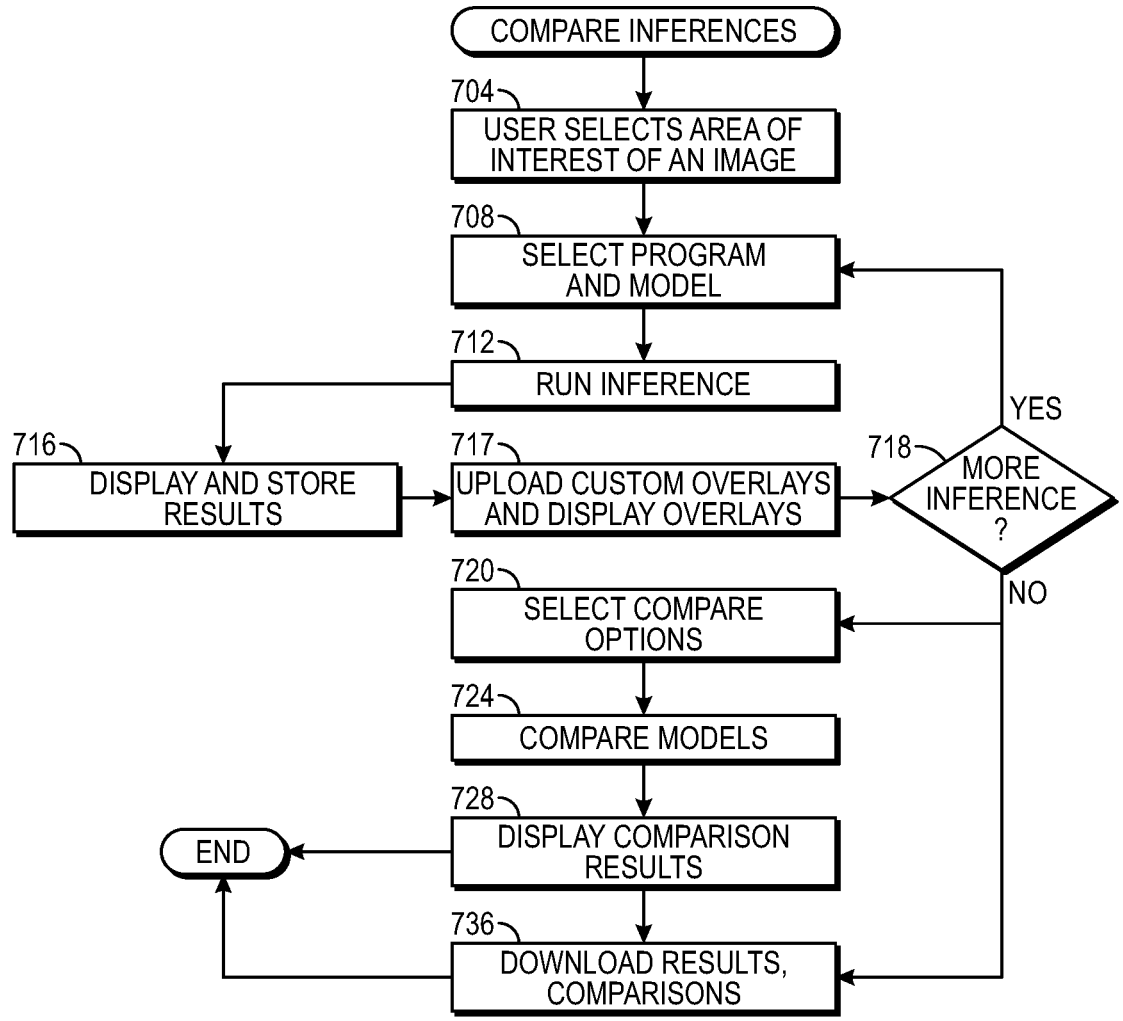
FIG. 13 is a flow diagram describing how user executes and compares inferences from machine learning models visually.

FIG. 13 is a flow diagram describing how user executes and compares inferences from machine learning models visually. The user may provide input in order to start the inference: select an area of interest, then select a model type and a version (if there are multiple to choose from). There are possible post-processing steps that the user may specify (e.g., generate a single output image with RGB representation of detected classes or generate geo-referenced files with all classes).

In a first step 704 a user selects a scene and then selects an area of interest within map viewer 210 of a particular image. Images (e.g., aerial images) are stored within storage server 130 using an application such as GeoServer, or similar. The user first selects an image for processing and this image will be loaded into the back-end module 150 for later processing by a particular model. It is also possible that the image has been preselected for the user and the user does not need to select the image himself or herself. The user then selects the scene and the area of interest using one of the selection tools 240 as has been described above and creates a selected area such as area 212, 330 or 340, for example.

Next, instep 708 the user selects a particular inference program 252 (such as a program that will detect clouds, building footprints, or any other types of objects within the image that the user wishes to identify); typically, an inference program will include one or more models or one or more pipelines that may be selected by the user at 254 to perform the inference. The selected model or pipeline is then loaded from the model repository 120 into the back-end module 150 for execution in module 152.

In step 712 the user executes the selected model or pipeline upon the selected area of interest by selecting button 262, and may have added any desired or necessary pipeline parameters in region 258, depending upon the model or pipeline selected. After step 712 has been performed the results are displayed within the user interface in step 716. The results for a particular interface may be displayed in any of a variety of manners. By way of example, returning to the cloud example of FIG. 2, the model may identify objects identified as clouds in different manners such as by using different colors, shading clouds versus non-clouds differently, flagging objects that are clouds, etc. FIGS. 8-12 also show results of an inference or inferences. These results are stored for later viewing and comparison and are typically stored in cloud storage or in a local download.

At any time, in step 717 the user may also press button 420 in order to upload any custom overlays such as ground truth overlays which are then displayed, such as is shown in FIG. 10. These overlays are also stored for later viewing and comparison.

Next, in step 718 the user decides whether to execute more inferences (perhaps using a different model or pipeline) or to upload further custom overlays, and if so, control returns to steps 708-717. If the user is done executing inferences and uploading custom overlays, then control moves to step 720 or step 736. Step 720 will be described first. In step 720 the user has the ability to compare results of inferences and ground truths as has been described above. By way of example, FIG. 11 shows overlays panel 260 in which a user may select inferences to compare, may vectorize or rasterize a particular overlay, etc. And, as shown and described in FIGS. 11 and 12, the user has the ability to choose available measures 552 to be presented in a quality analysis report. Once the user has selected desirable options, then in step 724 the user selects "Generate Report" 556 and a report is generated and comparison results are displayed in step 728 as has been shown and described above with reference to FIG. 12. In step 724 any number of models or pipelines may be compared, and may be compared to ground truths as well as described above.

The user also has the option to download any results, comparisons or reports. In step 736 the user may download to his or her computer the original image itself, an image of the selected area of interest, the results of any of the inferences that have been executed (i.e., the actual overlays, either in raster or vector form), any custom overlays (such as ground truths), and any reports that have been generated such as the tables or charts shown in FIG. 12.

Computer System Embodiment

Figure 14A:
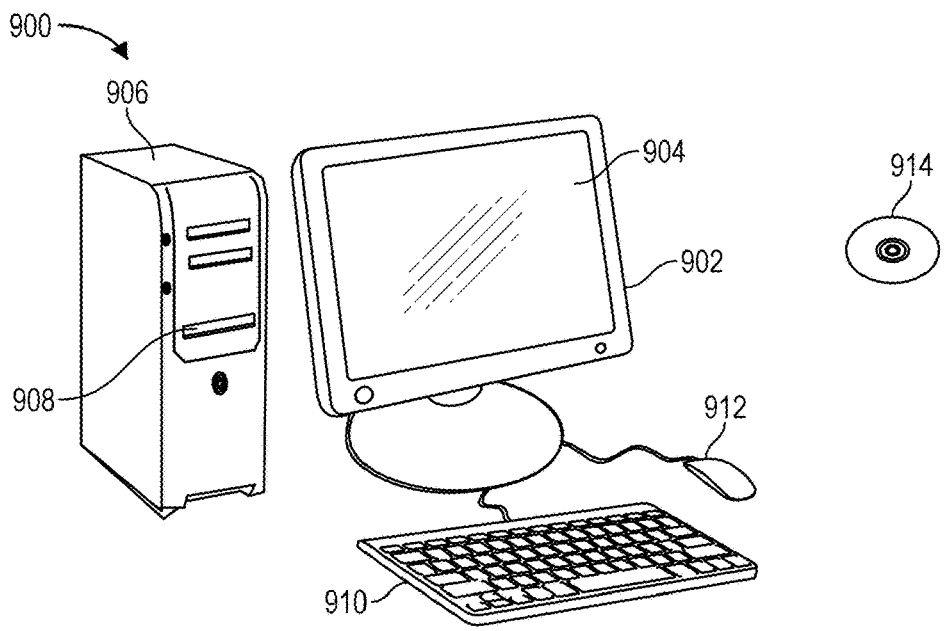
FIGS. 14A and 14B illustrate a computer system suitable for implementing embodiments of the present invention.
Figure 14B:
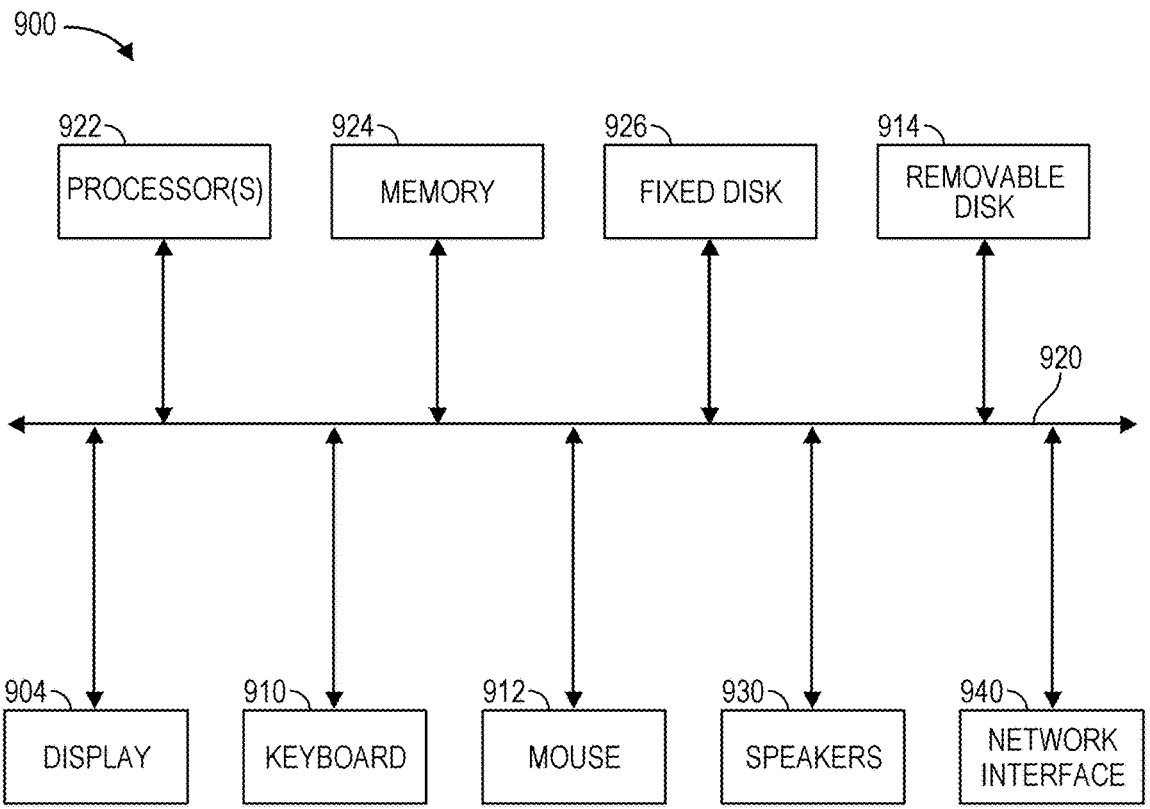

FIGS. 14A and 14B illustrate a computer system 900 suitable for implementing embodiments of the present invention. FIG. 14A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 14B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of displaying results of an inference on a user interface, said method comprising:
 displaying a geo-referenced image within a user interface of a user computer that includes a plurality of two-dimensional objects;
 receiving user input via said user interface that selects an area of said image that includes a subset of fewer objects than said plurality of objects;
 receiving user input via said user interface that selects a machine learning model for execution;
 executing said machine learning model upon said selected area of said image that includes said subset of said objects, wherein said machine learning model processes said selected area of said image; and
 displaying results of said execution of said machine learning model as an overlay over said subset of said objects on said user interface, wherein said overlay displays for each of said objects in said subset at least a shape that indicates a location on the surface of the Earth, a crosshatching within said shape that indicates an accuracy of said machine learning model, and an outline of each of said objects in said subset as determined by said execution of said machine learning model.

2. A method as recited in claim 1 further comprising:
 receiving user input via said user interface that selects a scene of said image that includes only a particular class of objects of said image.

3. A method as recited in claim 1 further comprising:
 using an area selection tool of said user interface to select said subset of objects, wherein said subset of objects contains fewer objects than said plurality of objects.

4. A method as recited in claim 1 wherein said user selects a pipeline of a plurality of machine learning models, wherein said execution executes said pipeline, and wherein said displaying displays results of said execution of said pipeline.

5. A method as recited in claim 1 wherein said overlay is rendered such that a region of said overlay corresponding to each object in said subset of objects has a degree of opacity that corresponds to a certainty that said machine learning model has identified said each object correctly.

6. A method as recited in claim 1 further comprising:
 uploading a custom overlay that is a ground truth overlay corresponding to said image; and
 displaying said ground truth overlay underneath said overlay.

7. A method as recited in claim 1 further comprising:
 vectorizing said overlay and displaying said vectorized overlay on said user interface.

8. A method as recited in claim 1 further comprising:
 executing a second machine learning model upon said selected area of said image, wherein said second machine learning model processes said selected area of said image; and
 displaying results of said execution of said second machine learning model as a second overlay over said subset of said objects on said user interface, wherein both said overlay and said second overlay are visible on said user interface and each having crosshatching different from one another.

9. A method of displaying results of an inference on a user interface, said method comprising:
displaying on a user interface of a user computer a first overlay representing an inference of a first machine learning model executed upon a set of objects in an image, wherein said first overlay is displayed over said objects of said image, wherein said first overlay displays for each of said objects at least a shape that indicates a location on the surface of the Earth, a crosshatching within said shape that indicates an accuracy of said first machine learning model, and an outline of each of said objects as determined by said execution of said first machine learning model;
receiving user input via said user interface that selects a second machine learning model for execution;
executing said second machine learning model upon said set of objects in said image, wherein said second machine learning model processes said set of objects in said image; and
displaying results of said execution of said second machine learning model as a second overlay over said set of objects on said user interface.

10. A method as recited in claim 9 wherein said images are a geo-referenced images.

11. A method as recited in claim 9 further comprising:
using an area selection tool of said user interface to select said set of objects, wherein said set of objects contains fewer objects than appear in said image.

12. A method as recited in claim 9 wherein said first overlay is rendered such that a region of said overlay corresponding to each object in said set of objects has a degree of opacity that corresponds to a certainty that said first machine learning model has identified said each object correctly.

13. A method as recited in claim 9 further comprising:
uploading a custom overlay that is a ground truth overlay corresponding to said image; and
displaying said ground truth overlay on said user interface.

14. A method as recited in claim 9 further comprising:
vectorizing said first or second overlay and displaying said vectorized first and second overlay on said user interface.

15. A method as recited in claim 9 further comprising:
receiving user input via said user interface that causes a comparison of said first overlay and said second overlay; and
displaying visual data from said comparison on said user interface.

16. A method as recited in claim 9 wherein both said first overlay and said second overlay are visible on said user interface and each having crosshatching different from one another.

17. A method of displaying results of an inference on a user interface, said method comprising:
displaying on a user interface of a user computer a first overlay representing an inference of a first machine learning model executed upon a set of objects in an image, wherein said first overlay is displayed over said objects of said image;
displaying on said user interface of a user computer a second overlay that is a ground truth corresponding to said set of objects in said image;
receiving user input via said user interface that selects said ground truth overlay as a reference;
receiving user input via said user interface that causes a comparison of said first overlay and said ground truth overlay; and
displaying visual data from said comparison on said user interface.

18. A method as recited in claim 17 wherein said images are a geo-referenced images.

19. A method as recited in claim 17 wherein said first overlay is rendered such that a region of said overlay corresponding to each object in said set of objects has a degree of opacity that corresponds to a certainty that said first machine learning model has identified said each object correctly.

20. A method as recited in claim 17 further comprising:
receiving user input via said user interface that causes rasterization of said ground truth overlay before said comparison.

21. A method as recited in claim 17 further comprising:
receiving user input via said user interface that causes execution of a second computer model upon said set of objects, wherein said comparison is a comparison of said first overlay, said ground truth overlay, and a second overlay resulting from said execution of said second computer model.

22. A method of displaying results of an inference on a user interface, said method comprising:
displaying on a user interface of a user computer M inference overlays, M>=2, each inference overlay representing a result of an inference of a machine learning model executed upon a set of objects in an image;
displaying on said user interface of said user computer N reference overlays, N>=2, each reference overlay representing information corresponding to said set of objects in said image;
receiving user input via said user interface that selects each of said N reference overlays as a reference;
receiving user input via said user interface that causes a comparison of said M inference overlays with said N reference overlays; and
displaying visual data from said comparison on said user interface.

23. A method as recited in claim 22 wherein said images are a geo-referenced images.

24. A method as recited in claim 22 wherein each of said M reference overlays is rendered such that a region of each of said overlays corresponding to each object in said set of objects has a degree of opacity that corresponds to a certainty that said corresponding machine learning model has identified said each object correctly.

25. A method as recited in claim 22 further comprising:
receiving user input via said user interface that selects whether not each of said M inference overlays shall be compared to any of said N reference overlays, wherein said displaying displays visual data for each of said comparisons that has been selected.

26. A method as recited in claim 22 wherein each of said N reference overlays is a ground truth overlay.

* * * * *